(12) United States Patent
Hillier et al.

(10) Patent No.: US 11,904,818 B2
(45) Date of Patent: Feb. 20, 2024

(54) SAFETY LINK

(71) Applicant: Timothy Hillier, Sherman Oaks, CA (US)

(72) Inventors: Timothy Hillier, Sherman Oaks, CA (US); Kelly Austin, Hidden Hills, CA (US)

(73) Assignee: Timothy Hillier, Sherman Oaks, CA (US)

( * ) Notice: Subject to any disclaimer, the term of this patent is extended or adjusted under 35 U.S.C. 154(b) by 580 days.

(21) Appl. No.: 17/004,121

(22) Filed: Aug. 27, 2020

(65) Prior Publication Data
US 2022/0063571 A1 Mar. 3, 2022

(51) Int. Cl.
*B60S 9/04* (2006.01)
(52) U.S. Cl.
CPC ........................................ *B60S 9/04* (2013.01)
(58) Field of Classification Search
CPC ........................................................ B60S 9/04
See application file for complete search history.

(56) References Cited

U.S. PATENT DOCUMENTS

| | | | |
|---|---|---|---|
| 6,695,290 B1 | 2/2004 | O'Connell | |
| 8,162,290 B1 | 4/2012 | Tracy | |
| 9,850,115 B2* | 12/2017 | Cho | B66F 13/00 |
| 2013/0099086 A1* | 4/2013 | Jevne | B66F 1/06 |
| | | | 248/511 |
| 2017/0203737 A1* | 7/2017 | Cho | B60S 9/04 |

OTHER PUBLICATIONS

International Search Report and Written Opinion issued in PCT/US021/047798, dated Jan. 6, 2022.
03DJEEPS. JeepsNeeds SAM for Hi-Lift Jack; Apr. 20, 2016 [Retrieved on Nov. 7, 2021]; https://www.youtube.com/watch?v=D0Rto6otQEo.
Jeeps Needs. D lift adaptor (DLA) for the Hi-lift jacks; Jul. 14, 2015 [Retrieved on Nov. 8, 2021]; https://www.youtube.com/watch?v=D1y205 IMs.

* cited by examiner

*Primary Examiner* — Nirvana Deonauth
(74) *Attorney, Agent, or Firm* — Akerman LLP

(57) ABSTRACT

A safety link for linking a high-lift jack to a vehicle may include an upper bracket and a lower bracket. The upper bracket may include one or more slots for securing the link to a vehicle shackle tab. The lower bracket may include one or more slots for securing the link to a jack.

14 Claims, 15 Drawing Sheets

SAFETY LINK

TECHNOLOGY

The present disclosure relates to lift pad links and stabilizing accessories for linking jacks and objects to be lifted.

BACKGROUND

Typical jacks utilize mechanical configurations such as scissors or screws, hydraulics, and compressed air to lift objects. Jacks are available in many configurations such as floor jacks, scissor jacks, bottle jacks, and farm jacks. Jacks that are used to lift objects higher or from a higher position than a typical jack may be referred to as high-lift jacks. These types of jacks are especially useful for raising high frame vehicles, e.g., tall SUVs, vehicles with raised suspensions, or lifted frames. High-lift jacks typically include a vertical I-beam bar having a series of holes. A runner wraps around the I-beam. A foot extends from the runner, horizontally from the post, and includes a lift pad for placing under a bumper or frame. The runner includes a ratcheting mechanism that uses a climbing pin that may be ratcheted with a lever to insert, withdraw, and reinsert into the series of holes to climb the I-beam, raising the lift pad.

SUMMARY

The present disclosure describes a safety link for a jack. The link may include an upper bracket and a lower bracket. The upper bracket may include one or more slots for securing the link to a vehicle shackle tab. The lower bracket may include one or more slots for securing the link to a jack.

In one example, the upper bracket may include two or more slots. The slots may correspond to different vehicle heights. The slots may be situated in an upper portion of the upper bracket.

In operation, a vehicle shackle tab may be aligned with one of the one or more slots in the upper bracket. A clevis pin may be inserted through the shackle tab and slot. The clevis pin may be secured into place with a cotter pin.

The lower bracket of the link may contain one or more slots for securing to a foot or lift pad of a jack. The lift pad or foot may also contain a slot. In operation, the foot or lift pad may be inserted into the lower bracket of the link so that the slot of the foot aligns with one of the one or more slots in the lower bracket of the link. A clevis pin may then be inserted through the slot in the foot and the slot in the lower bracket. The clevis pin may be secured into place with a cotter pin.

In one aspect, a safety link for a high-lift jack includes an upper bracket and a lower bracket. The upper bracket may include one or more slots for connecting the link to a vehicle shackle tab via insertion of a first pin into at least one of the one or more upper bracket slots and a slot through the shackle tab. The lower bracket may include one or more slots for connecting the link to a runner of a jack via insertion of a second pin into at least one of the one or more lower bracket slots and a slot through a runner nose of the runner.

In various embodiments, the link includes the first pin and the second pin. The upper bracket may include a first slot and a second slot wherein the first slot is positioned above the second slot. In an above or another example, a horizontal plate may extend above the one or more slots of the lower bracket and below the one or more slots of the upper bracket. The horizontal plate may be positioned to engage a lift pad extending along the runner nose when the link is connected to the runner. In an above or another example, the lower bracket may include a first vertical plate and a second vertical plate. The second vertical plate may be spaced apart from the first vertical plate. The one or more lower bracket slots may include a first slot that is defined by and that extends between a first opening through the first vertical plate and a second opening through the second vertical plate. The upper bracket may include a third vertical plate and a fourth vertical plate. The fourth vertical plate may be spaced apart from the third vertical plate. The one or more upper bracket slots may include a third slot that is defined by and that extends between a third opening through the third vertical plate and a fourth opening through the fourth vertical plate. The first and third vertical plates may extend along a first plane and/or the second and fourth vertical plates may extend along a second plane.

In another aspect, a method of securing a safety link to a jack and a vehicle shackle tab may include aligning a first slot of a lower bracket of the link with a second slot extending through a runner nose of a jack; extending a first pin through the first slot and second slots; aligning a third slot in an upper bracket of the link with a fourth slot in a vehicle shackle tab; and extending a second pin through the third slot and the fourth slot.

In various embodiments, the link may include a plate that extends above the first slot and below the second slot. In one example, aligning the first slot and the second slot comprises positioning the plate on a lift pad that extends along the runner nose.

In still another aspect, a method of securing a safety link to a jack and a vehicle shackle tab includes connecting a lower bracket of the link to a runner nose of a jack; and connecting an upper bracket of the link to a vehicle shackle tab.

BRIEF DESCRIPTION OF THE DRAWINGS

The novel features of the described embodiments are set forth with particularity in the appended claims. The described embodiments, however, both as to organization and manner of operation, may be best understood by reference to the following description, taken in conjunction with the accompanying drawings in which:

DESCRIPTION

Figure 1:
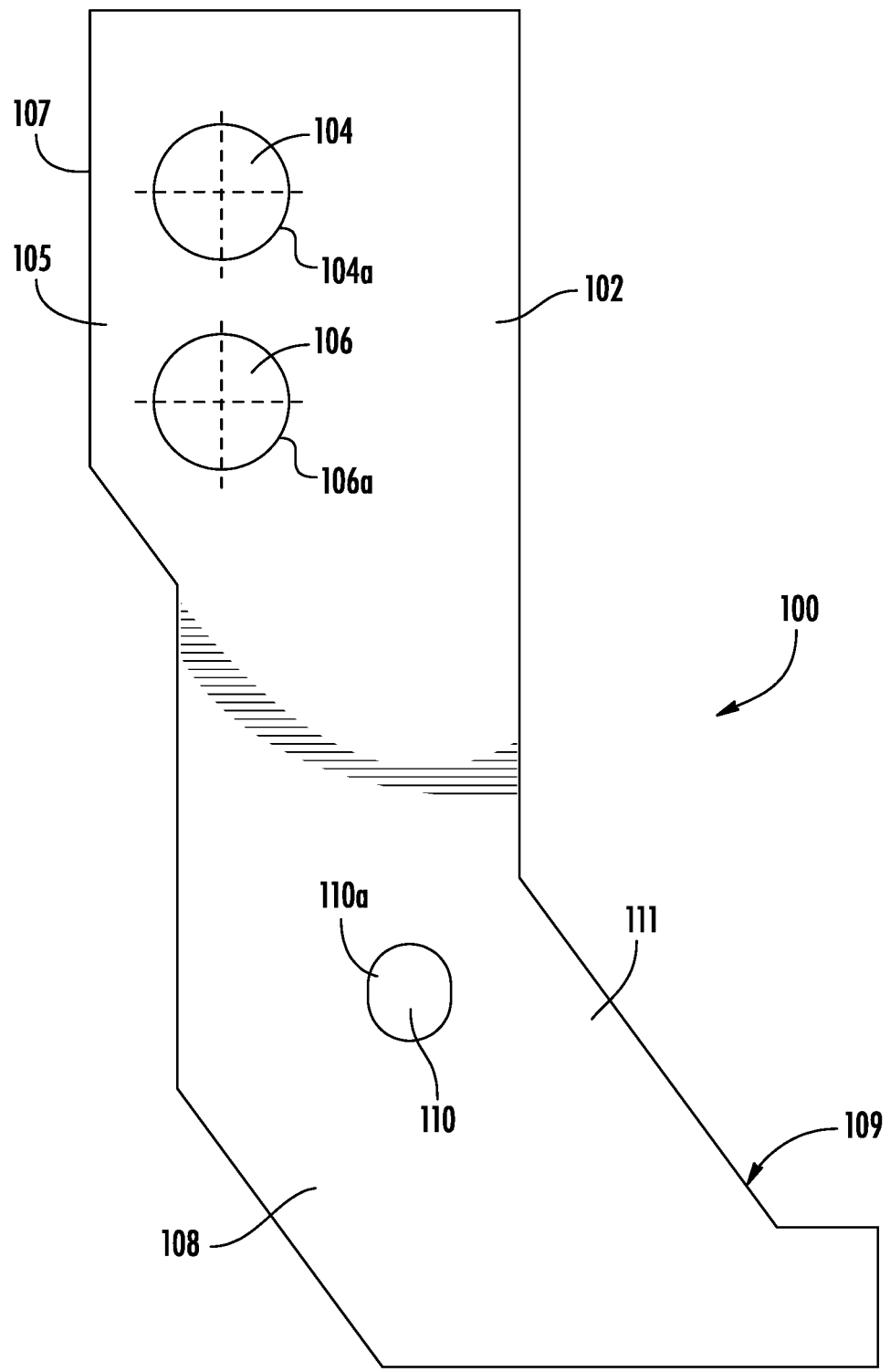
FIG. 1 is an elevated side view of a safety link according to various embodiments described herein.

The present disclosure describes various embodiments of an improved safety link for a jack that addresses various practical limitations of current safety links for jacks. For example, current high-lift jack adaptors are generally unsecure and unstable and are at risk of slipping out of place while in use.

The present disclosure relates to a safety link ("link") that may be used with jacks, such as farm jacks, e.g., high-lift or bumper jacks, toe jacks, and other suitable jack configurations. The link may typically be utilized to couple to a lift structure of a jack, which as used herein includes jack structures that are raised by the operation of the jack. For example, lift structures may include lift pads having one or more surfaces upon which an object to be lifted is to be supported during operation of the jack. A high-lift jack, for instance, includes a runner comprising a lift structure, which may also be referred to as a foot or shoe, including a lift pad. Lift structures or lift pads thereof may include planar or contoured engagement surfaces for supporting an object while being lifted by the jack. Some lift pad configurations may also include structures for receiving or engaging a corresponding or mating structure of the object to be lifted.

In various embodiments, the link may be used to secure the jack to a vehicle or other object to be lifted. For example, the link may secure to a mount provided on a vehicle bumper or elsewhere. As introduced above, the link may also secure to a lift structure, such as a runner, of a jack. Thus, according to various embodiments, the link may be configured to connect to a jack, e.g., via connection with a lift structure of the jack, and to an object to be lifted, such as a vehicle. For example, the link is configured to connect to a runner of a high-lift, farm jack style jack and to a shackle tab of a vehicle to be lifted, thereby securing the jack to the vehicle. Beneficially, the link may eliminate certain unsafe hoisting practices such as the common practice of connecting a high-lift jack to a screw pin anchor shackle.

In various embodiments, the link may be utilized as a recovery/safety gear for off-road type vehicles, vehicles with high or raised frames, and/or vehicles with suitable mounting points to which the link may connect. For example, the link may include an upper bracket and a lower bracket wherein the upper bracket is configured to couple to a vehicle shackle tab, such as a shackle tab of an off-road vehicle, and the lower bracket is configured to couple to a lift structure of a jack. The link may be configured to make lifting such a vehicle safer by connecting the jack to the bumper of the vehicle through the shackle tabs. For example, the link may provide a secured connection between the jack and a bumper shackle tab that prevents slippage at the hoisting point, creating a safer lift for the end user. In various embodiments, the safety link may be used in conjunction with a farm jack style high-lift jack, such as Hi-Lift® jacks sold by The Bloomfield Manufacturing Co.

Figure 15:
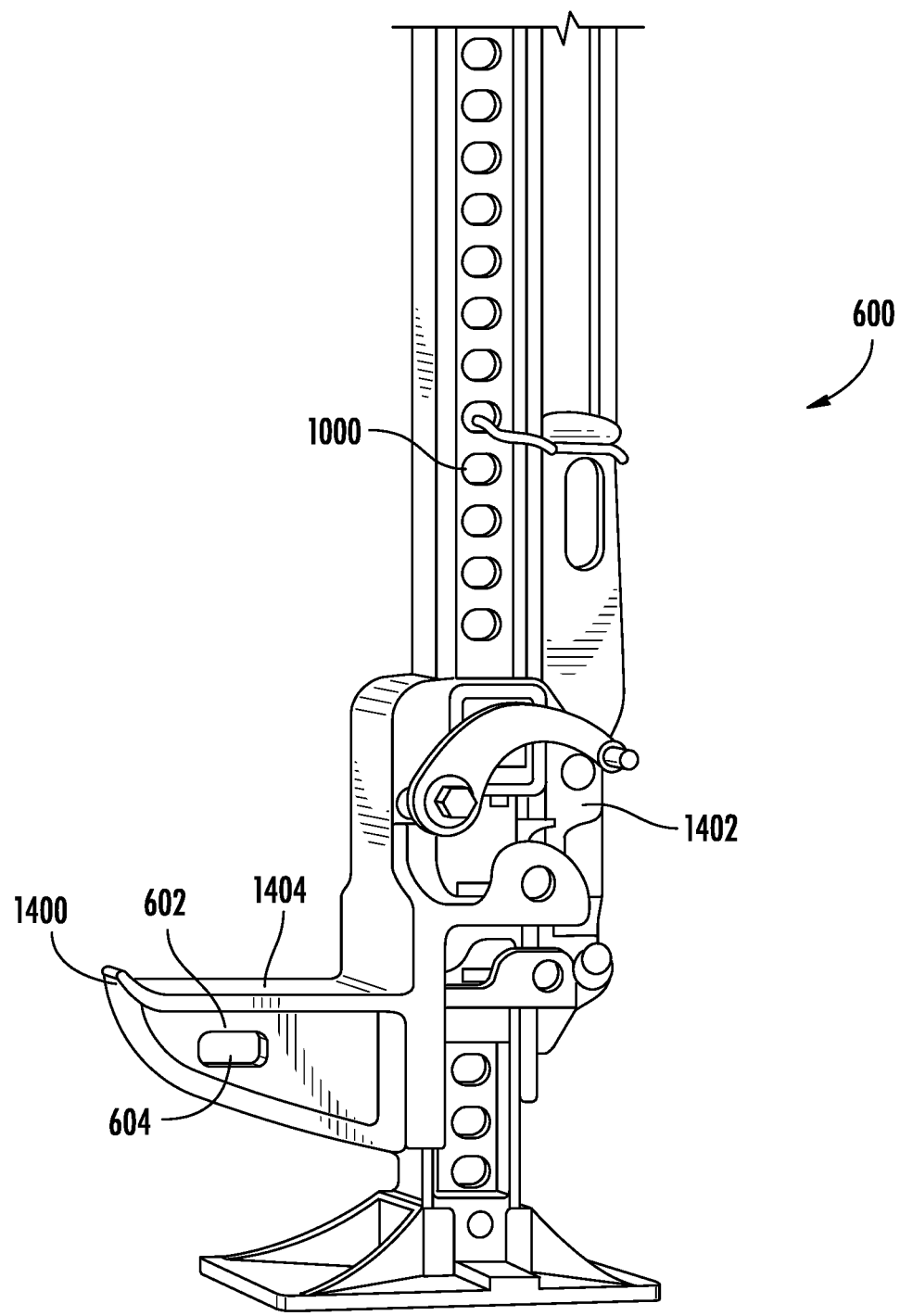
FIG. 15 is a perspective view of a high-lift jack suitable for linking to a vehicle via the safety link according to various embodiments described herein.

FIG. 15 illustrates an embodiment of a farm or high-lift jack 600, which may be used in conjunction with the safety link 100 described herein. The high-lift jack 600 includes a vertical bar 1000 and a runner 1402 that may be ratcheted up and down the bar. A foot 602 extends from the runner 1402, horizontally from the bar 1000. The foot 602 includes a lift pad 1404 positioned along an upper portion of a runner nose 1400 for placing under a bumper or other vehicle lift point. A slot 604 also extends through the runner nose 1400. In some embodiments, a lower bracket of the link may be connected to the foot 602 and an upper bracket of the link may be connected to the vehicle, e.g., to a shackle tab.

FIGS. 1-14 illustrate various exemplary embodiments and features of a safety link according to various embodiments wherein like numbers refer to like features.

Figure 14:
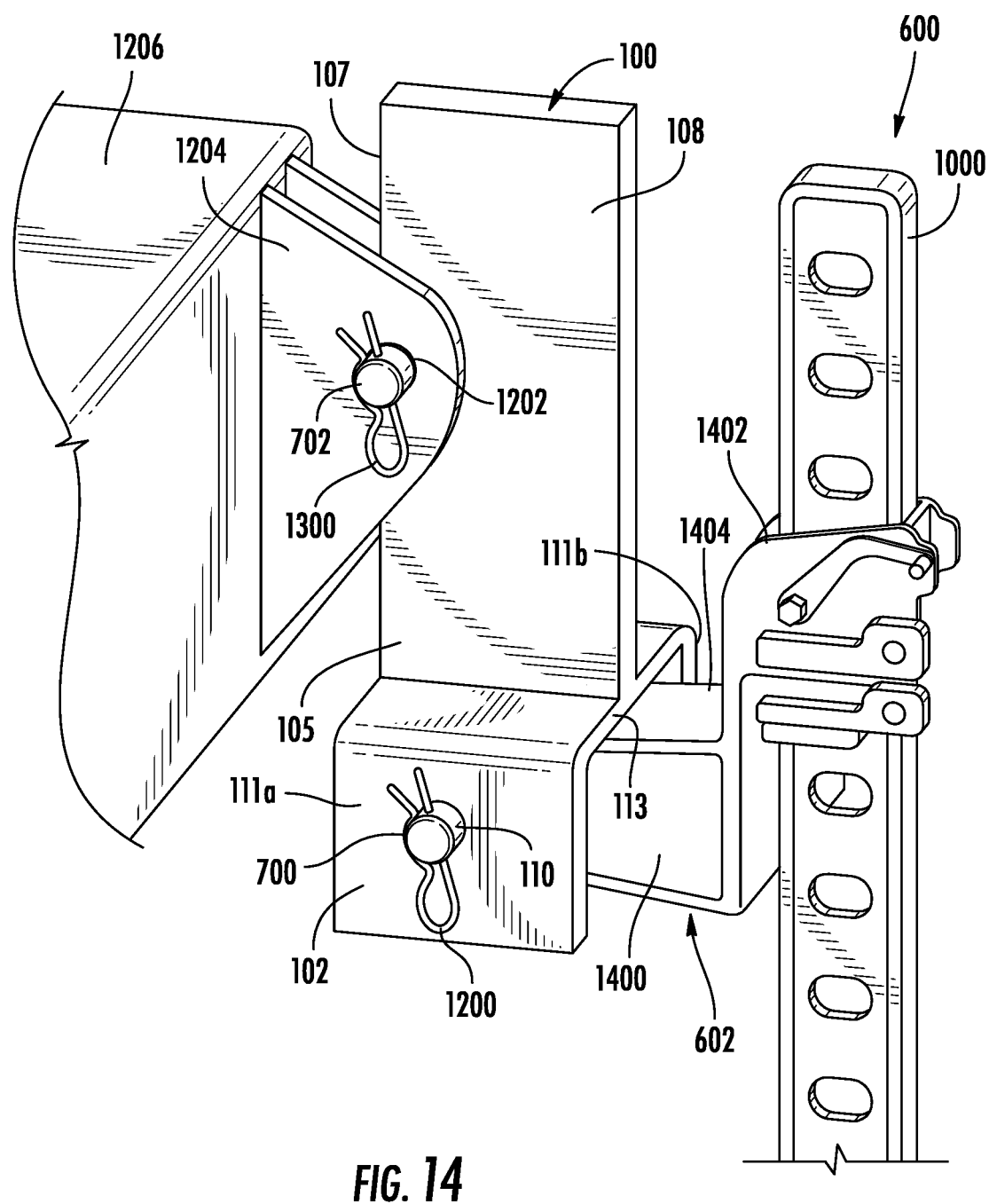
FIG. 14 is a perspective view of a safety link connected between a vehicle and a jack according to various embodiments described herein.

FIG. 14 illustrates an embodiment of a safety link 100 linking a jack 600 to a shackle tab 1204 of a vehicle (not visible) according to various embodiments described herein. As introduced above, the link 100 may include an lower bracket 108 and a upper bracket 102. The lower bracket 108 may be configured to secure the link to a slotted structure such as a shackle tab 1204 or bumper 1206 having a shackle tab 1204 or other slotted structure. One or more openings (not visible) may be provided through one or more plates 105, which may be referred to as vertical plate 105, of the lower bracket 108 to provide a slot (not visible) therethrough. The vertical plate 105 extends generally in the vertical direction. In the illustrated embodiment, a pin 702 is slotted through the shackle tab 1204 and the slot formed by the opening in lower bracket 108 to connect the link 100 to the vehicle via the shackle tab 1204. In some embodiments, a forward edge 107 of the lower bracket 108 may extend a distance from one or more slots of the lower bracket 108 to engage the bumper 1206 structure adjacent to the shackle tab 1204 to prevent or limit rotation of link 100 relative to the vehicle.

The upper bracket 102 also includes one or more slots 110 for connecting to the jack 600 via the runner 1402. The one or more slots 110 may include one or more openings 110*a* through the upper bracket 102. In the illustrated embodiment, the upper bracket 102 includes two vertically extending plates 111*a*, 111*b*, each including an opening 110*a* (opening in plate 111*b* is not visible). To secure the jack 600 to the link 100, the runner nose 1400 may be positioned between the openings 110*a* of the plates 111*a*, 111*b* and a pin 700 may be inserted thorough the slot 110 extending therebetween and a slot 604 (see, FIG. 15) in the runner nose 1400.

In the illustrated embodiment, the upper bracket 102 includes a horizontally extending plate 113 or cross-member positioned above slot 110. The horizontal plate 113 may position over the runner nose 1400 when connected to the link 100. The horizontal plate 113 may connect to one or more both vertical plates 111*a*, 111*b* of the upper bracket 102. Cotter pins 1200, 1300 may be used to prevent the pins 700, 702 from unintentionally dislodging. In operation, the horizontal plate 113 plate may interface with the lift pad 1404 to provide additional support when connected to the jack 600. In some embodiments, the horizontal plate 113 may not interface with the lift pad 1404 under normal use and may comprise a safety feature in case of pin failure. In another embodiment, the link 100 may not include a horizontal plate 113. In one such example, the link 100 may be configured to connect to a runner nose 1400 comprising a slot having a non-circular cross-section shape or a having a cross-section shape that does not allow rotation of a pin 700. In one such example, the pin 700 has a complimentary cross-section shape to that of the slot. The upper bracket 102 may include one or more slots 110 having a cross-section shape that corresponds to the cross-section shape of the slot in the runner nose 1400 such that, when a pin 700 having a cross-section shape corresponding to that of the openings 110a and the slot in the runner nose 1402 is inserted, the link 100 is prevented from rotating relative to the runner nose 1400. In another example, the link 100 may be configured to connect to a runner nose 1400 comprising multiple slots wherein the upper bracket 102 includes multiple corresponding slots 110 that extend through the vertical plates 111a, 111b between corresponding openings 110a such that multiple pins may be inserted through the upper bracket 102 slots 110 and the slots in the runner nose 1400 to prevent rotation of the runner nose 1400 with respect to the link 100.

As described in more detail below, other link configurations may include multiple vertical plates extending along the upper bracket 102, a horizontal plate extending between two or more of the multiple vertical plates of the upper bracket 102, a horizontal plate extending between the vertical plates 111a, 111b of the lower bracket, and/or a lower bracket extension that in use extends below the foot 602 to position adjacent to the bar 1000 of the jack 600 to provide additional support. In one such example, the link 100 has an L-shape to provide superior stability when in use. In one embodiment, the link includes multiple slots or pairs of slots for securing the link 100 to a shackle tab 1204, which may correspond to different vehicle heights. In the illustrated embodiment, the upper bracket 102 includes a slot and opening (not visible) through plate 105 that is vertically offset from one or more slots 110 and corresponding openings 110a through the lower bracket 108 such that the slot of the upper bracket 102 is forward of one or more slots 110 through the lower bracket 108. In a further or another embodiment, one or more slots in the upper bracket 102 may not be vertically offset from one or more slots 110 through the lower bracket 108 and/or one or more slots 110 through the lower bracket 108 may be vertically offset forward of one or more slots through the upper bracket 102.

FIG. 1 illustrates a side view of the safety link 100 according to various embodiments. The upper bracket 102 includes one or more vertical plates 105 including one or more slots 104, 106 through one or more openings 104a, 106a. The lower bracket 108 includes one or more vertical plates 111 comprising one or more slots 110 through one or more openings 110a. The plates 105, 111 may have various shapes and are not limited by those exemplified in the drawings. In the illustrated embodiment, the upper bracket 102 includes multiple slots 104, 106 through openings 104a, 106a in the vertical plate 105, which is located in the upper portion of the upper bracket 102 in this embodiment but may be located elsewhere in other embodiments. The slots 104, 106 are spaced apart to correspond to different vehicle heights to which the safety link 100 may be attached. The slot 110 in the lower bracket 108 is disposed in an upper portion of the lower bracket 108 but may be disposed elsewhere in other embodiments. The slot 110 in the lower bracket 108 is vertically offset rearwardly from slots 104, 106 in the upper bracket 102. In other embodiments, slot 110 may be vertically aligned and/or offset forward of one or more of the slots 104, 106 through the upper bracket 102. The link 100 also includes an extension 109 that extends below slot 110 to position adjacent to the bar of a jack for additional stability and/or safety. Pins may be inserted through slot 104 or 106 to connect the link 100 to a vehicle in a manner similar to that described with respect to FIG. 14.

Figure 2:
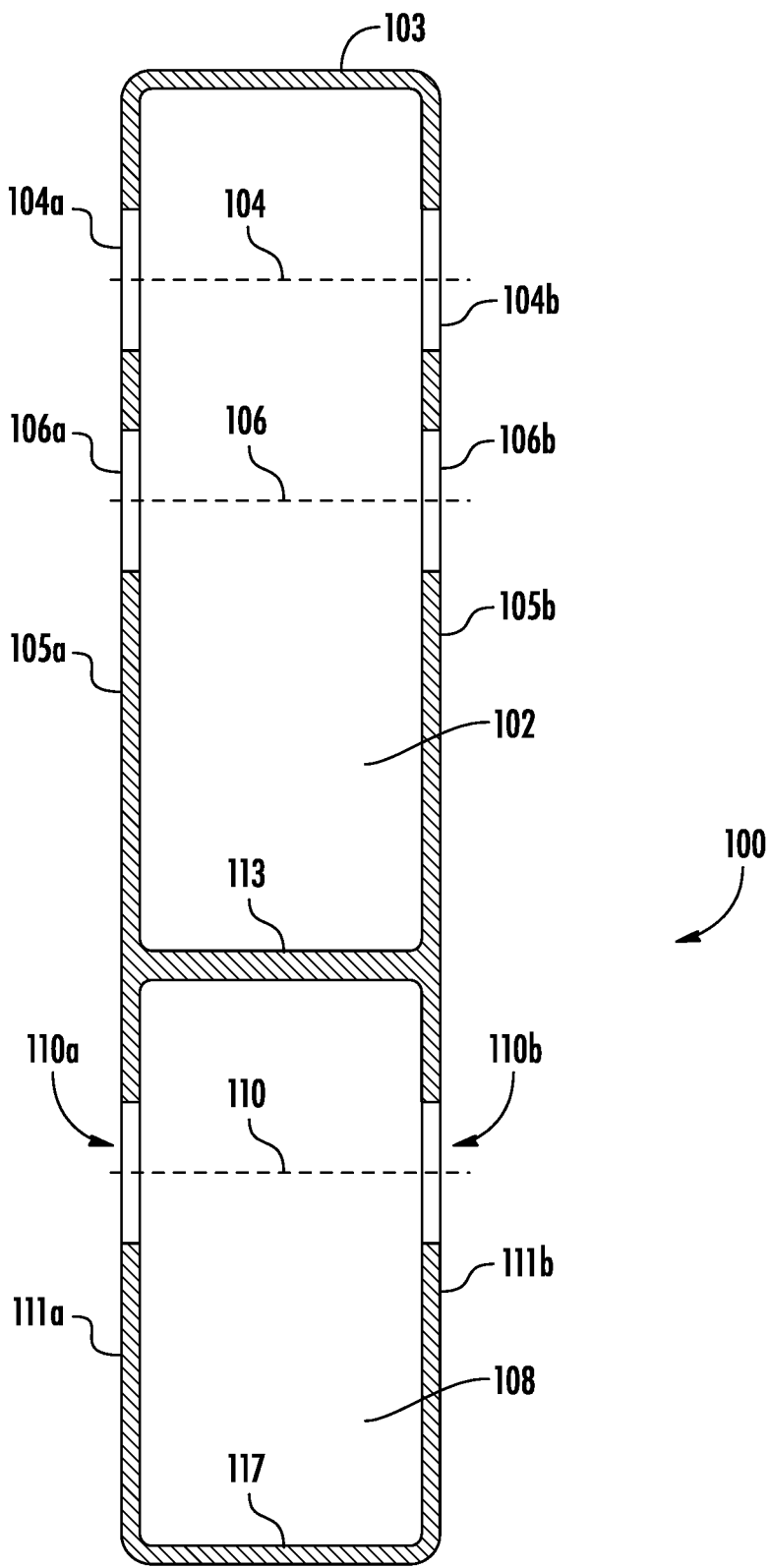
FIG. 2 is a cross-section front view of a safety link according to various embodiments described herein.
Figure 3:
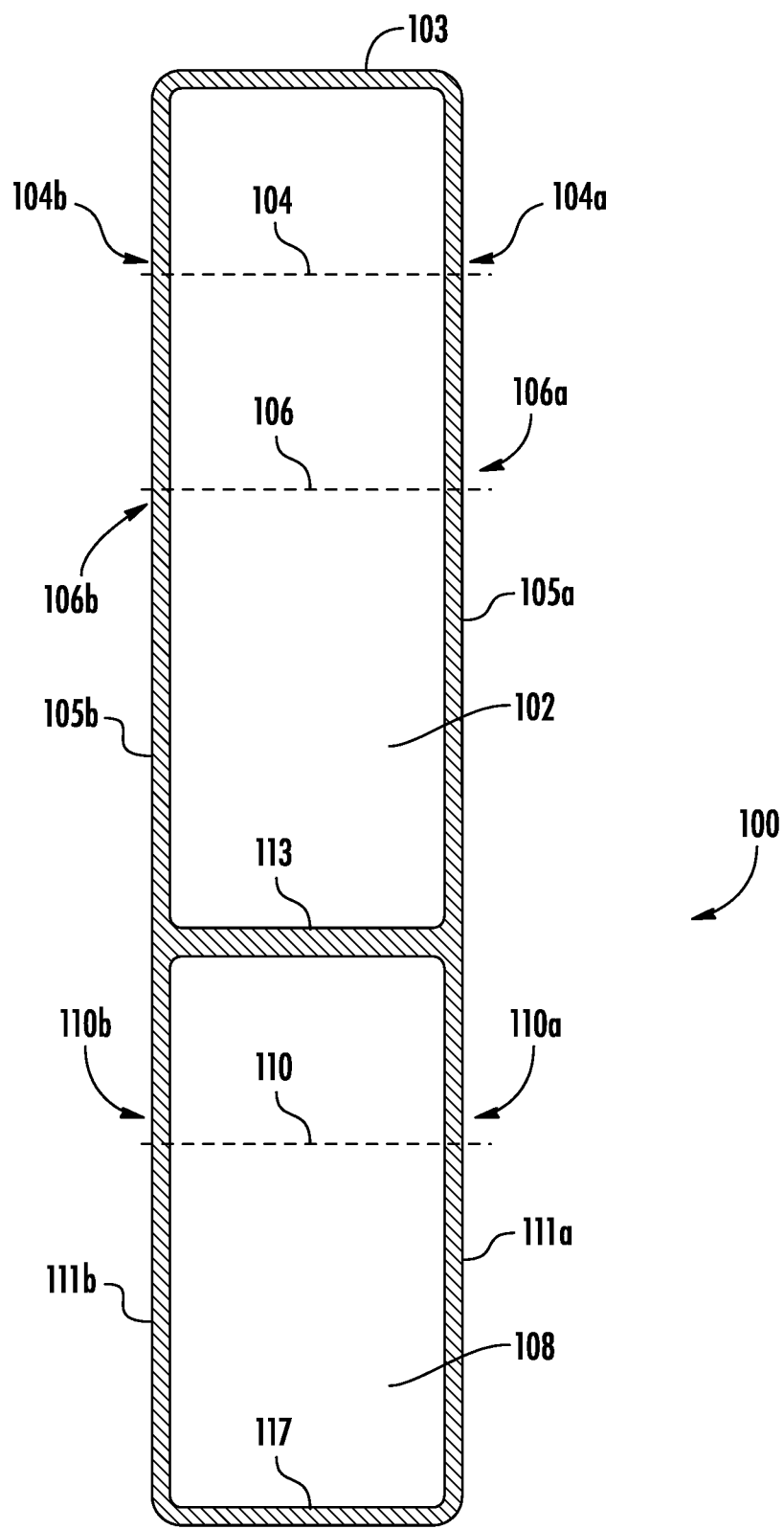
FIG. 3 is a rear view of a safety link according to various embodiments described herein.

With reference to FIG. 2, illustrating a front view, in cross-section, of one embodiment of the safety link 100 illustrated in FIG. 1, and FIG. 3, illustrating a rear view of the embodiment of the link 100, the lower bracket 108 may include a slot 110 extending between vertical plates 111a, 111b through corresponding openings 110a, 110b for securing the link 100 to a jack via a pin through the slot 110 and a slot through the jack. For example, a pin may be inserted through opening 110a and further extended along the slot 110 through opening 110b while a slot through the foot of the jack is lined up with the slot 110 in the lower bracket 108. A clevis pin may be used and further held in place via a cotter pin.

The upper bracket 102 includes one or more slots 104, 106 extending between one or more corresponding openings 104a, 104b, 106a, 106b through one or more vertical plates 105a, 105b of the upper bracket 102 for securing the link 100 to a vehicle shackle tab via a pin. In the illustrated embodiment, the upper bracket 102 includes two slots 104, 106 that may correspond to different vehicle heights to which the link 100 may be connected. Slot 104 may extend between corresponding openings 104a, 104b, and slot 106 may extend through corresponding openings 106a, 106b. A pin may be inserted through one of the openings 104a, 106a in vertical plate 105a and further extended along the slot 104, 106 through one of the openings 104b, 106b in vertical plate 105b while the vehicle shackle tab is lined up with the respective slot 104, 106 in the upper bracket 102 appropriate for the height of the vehicle and/or shackle tab. The illustrated upper bracket 102 also includes a horizontally extending plate 103 that extends above the one or more slots 104, 106. A horizontally extending plate 113 also extends above slot 110 while another horizontally extending plate 117 extends below slot 110. In some embodiments, the link does not include one or more of horizontal plate 103, horizontal plate 113, or horizontal plate 117.

FIG. 3 illustrates an embodiment of a rear view of the safety link 100. In this embodiment, the link includes a lower bracket 108 and an upper bracket 102. The lower bracket 108 may contain a slot 110 for securing the link 100 to a high-lift jack via a clevis pin. The slot 110 is comprised of a first opening 110a and a second opening 110b. A clevis pin may be inserted into the first opening 110a and through the second opening 110b after the slot in the foot of the high-lift jack is lined up with the slot 110 in the lower bracket 108. The clevis pin may be held in place via a cotter pin. The upper bracket 102 may contain two slots 104 and 106 for securing the link 100 to a vehicle shackle tab via a clevis pin. These two slots 104 and 106 may correspond to different vehicle heights to which the safety link 100 may be attached. The first slot 104 may contain a first opening 104a and a second opening 104b. A clevis pin may be inserted into the first opening 104a and through the second opening 104b after the vehicle shackle tab is lined up with the slot 104 in the upper bracket 102 corresponding to the appropriate vehicle height. The second slot 106 may contain a first opening 106a and a second opening 106b. A clevis pin may be inserted into the first opening 106a and through the second opening 106b after the vehicle shackle tab is lined up with the slot 106 in the upper bracket 102 corresponding to the appropriate vehicle height.

Figure 4:
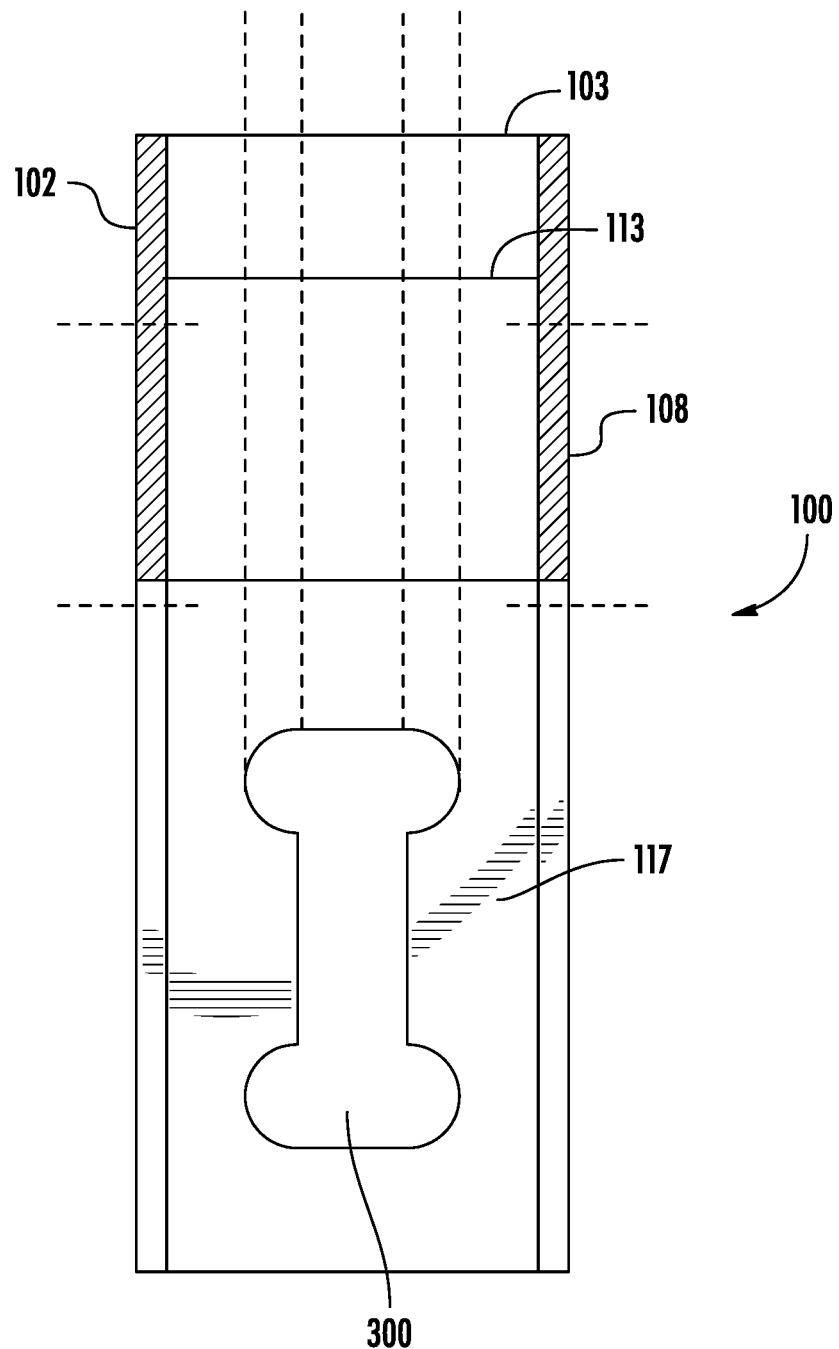
FIG. 4 is a bottom view of a safety link according to various embodiments described herein.
Figure 5:
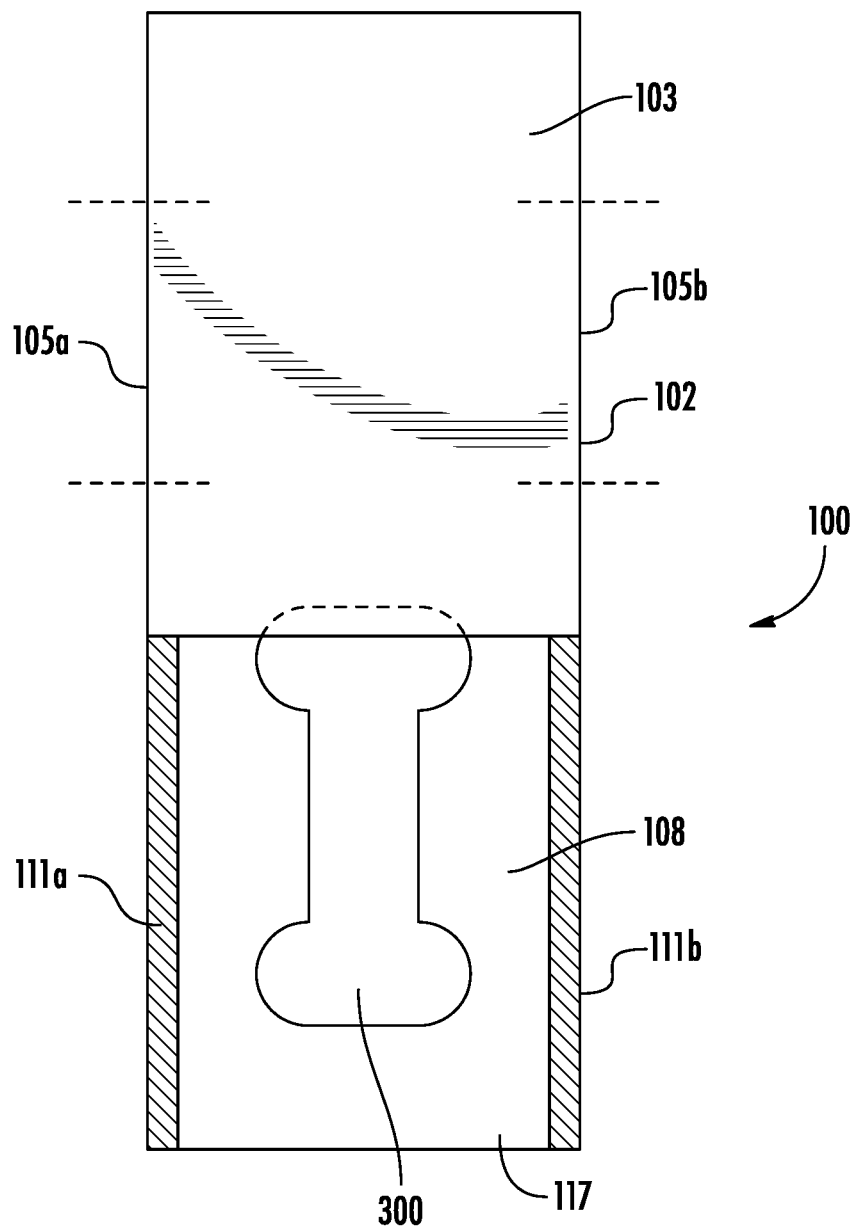
FIG. 5 is a top view of a safety link according to various embodiments described herein.
Figure 10:
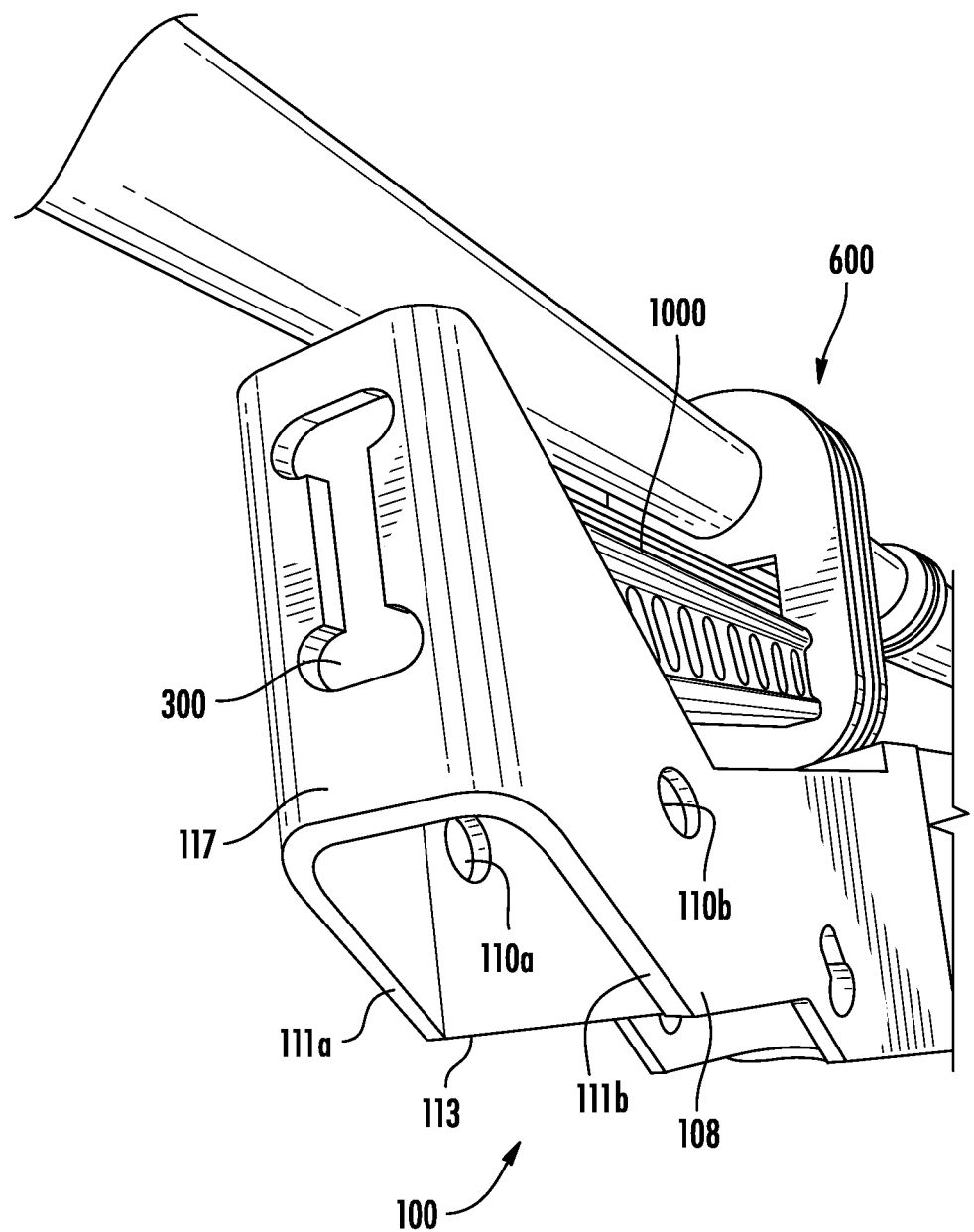
FIG. 10 is a bottom view of a safety link with a vertical bar of a jack aligned with a cutout according to various embodiments described herein.
Figure 11:
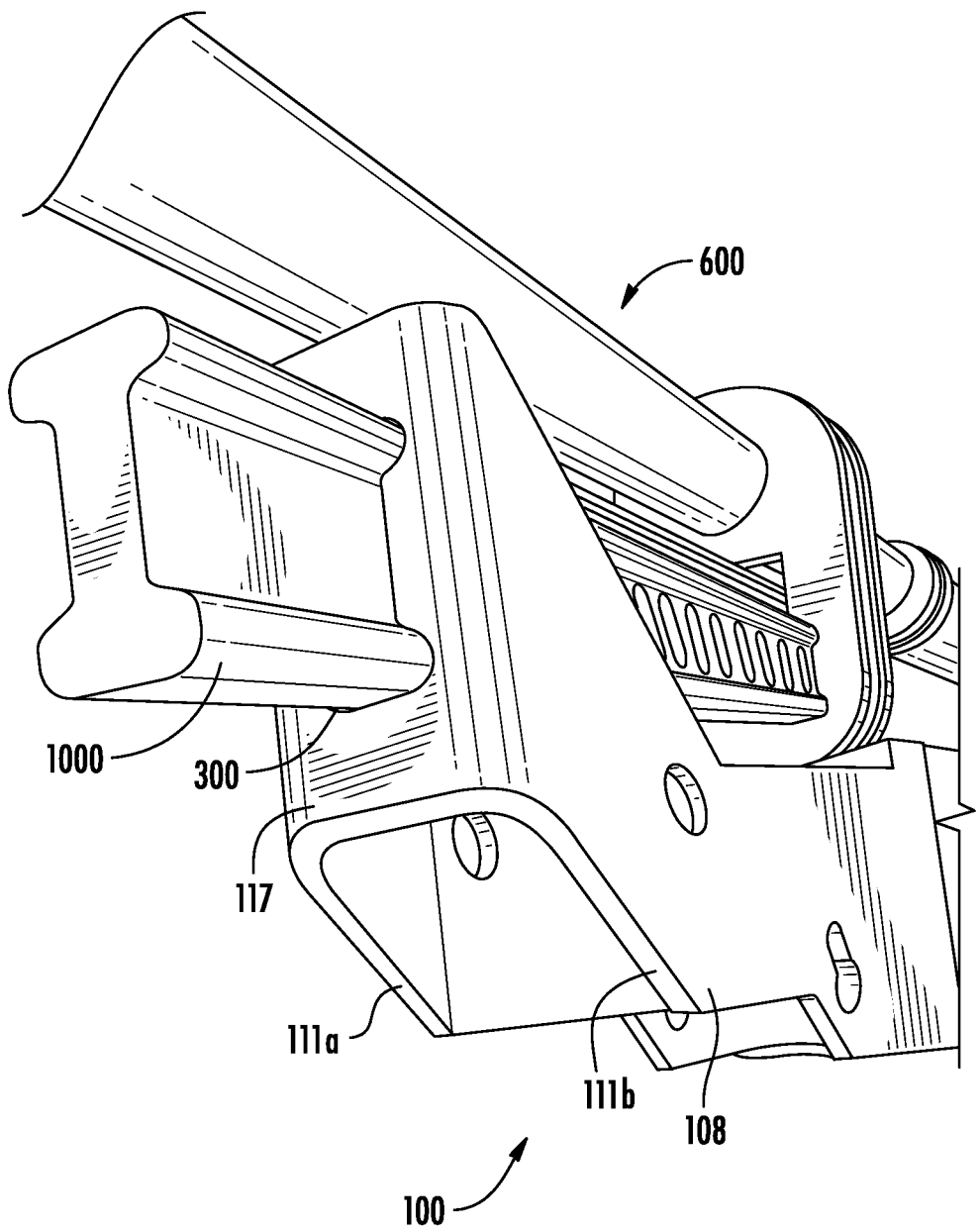
FIG. 11 is a bottom view of the safety link and jack of FIG. 10 with the vertical bar of a jack inserted through the cutout according to various embodiments described herein.

In some embodiments, the safety link 100 may be configured for convenient storage. For example, FIGS. 4 & 5 illustrates bottom and top views, respectively, of an embodiment of the link 100 comprising a cutout 300 in a horizontal plate 117 that extends along a lower portion of the lower bracket 108. A portion of the cutout 300 that is obscured by horizontal plate 103 and horizontal plate 113 in the top view of FIG. 5 is depicted in broken lines. The cutout 300 defines a bone-shaped opening corresponding to a cross-section of a bar of a high-lift jack. The cutout 300 may be utilized for convenient storage of the link 100 with the jack, e.g., as shown in FIGS. 10 & 11. FIG. 10 depicts a bottom view of an embodiment of the link 100 wherein the cutout is lined up with a bar 1000 of a high-lift jack 600. With further reference to FIG. 11, the bar 1000 may be inserted through the cutout 300 to couple the link 100 to the jack 600 for storage. In some embodiments, cutouts 300 may be located at other locations. It is to be appreciated that cutouts may comprise other cross-section shapes and be positioned at other locations to receive jack structures for combined storage. Such cross-section shapes may correspond to the cross-section shapes of the jack structures they are to receive or may be otherwise of larger cross-section than that of the structures they are to receive.

Figure 6:
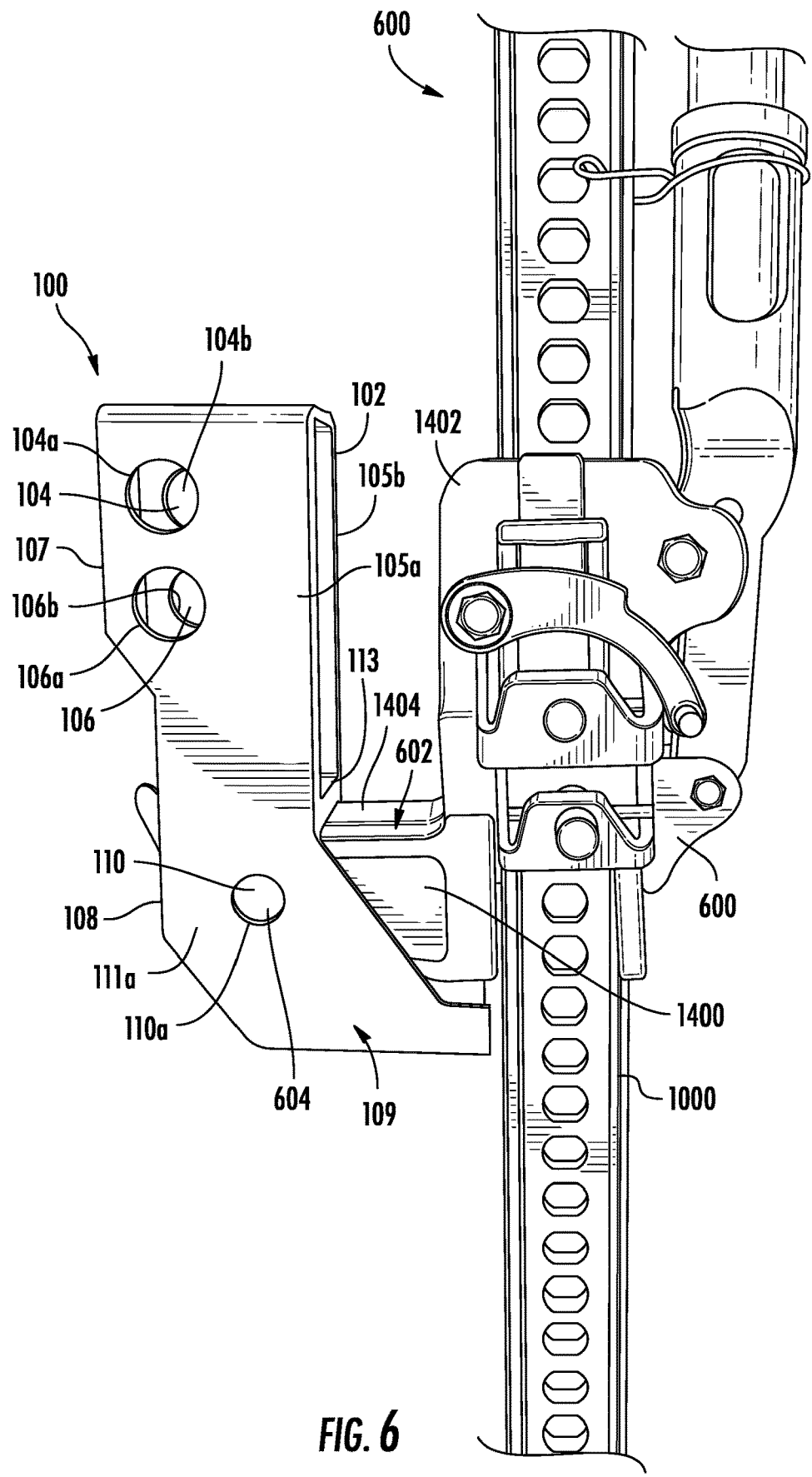
FIG. 6 depicts the safety link with a runner nose of a jack received within the lower bracket according to various embodiments described herein.
Figure 7:
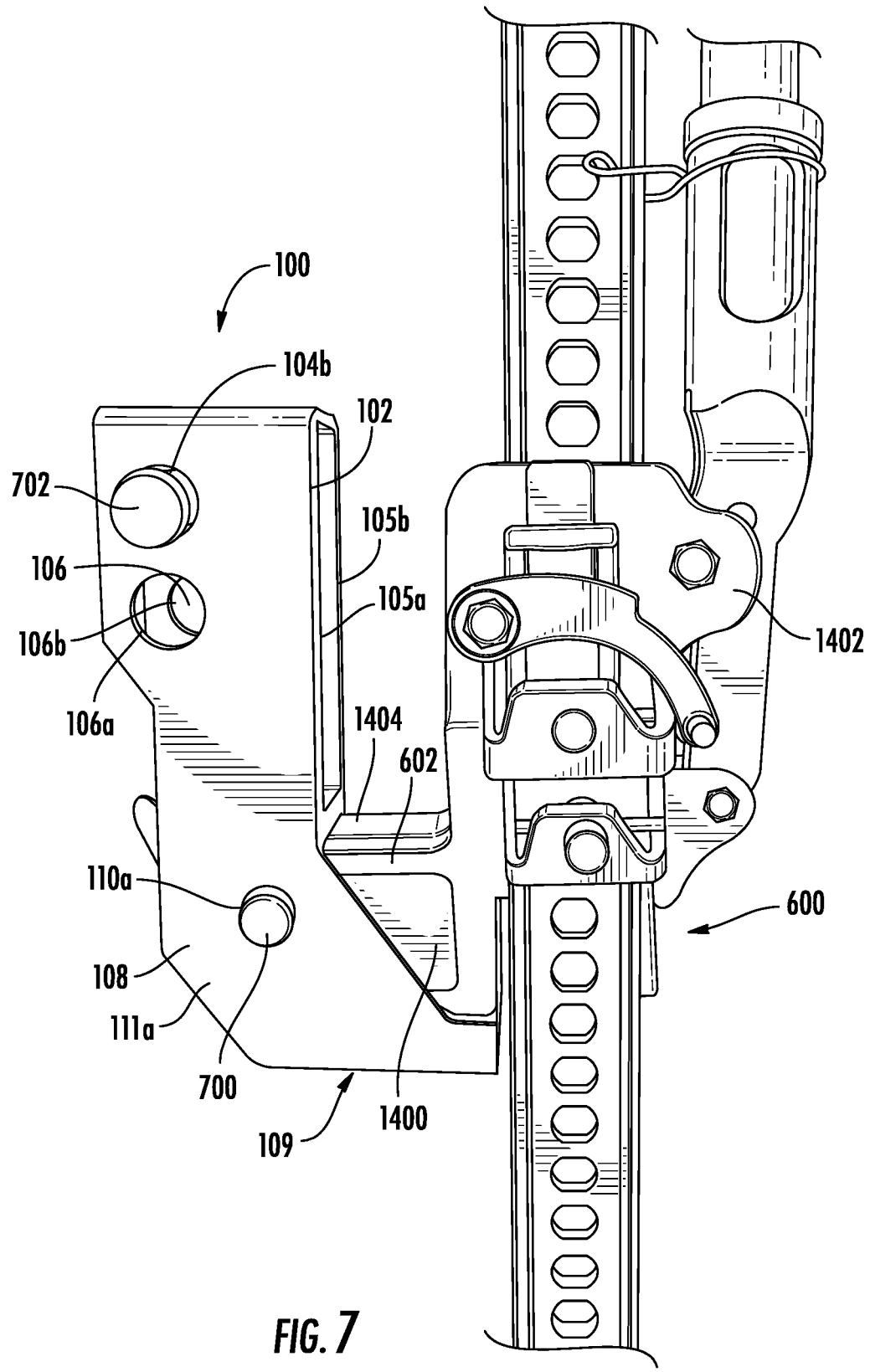
FIG. 7 depicts a pin extended through slots of the safety link and jack of FIG. 6 according to various embodiments described herein.
Figure 8:
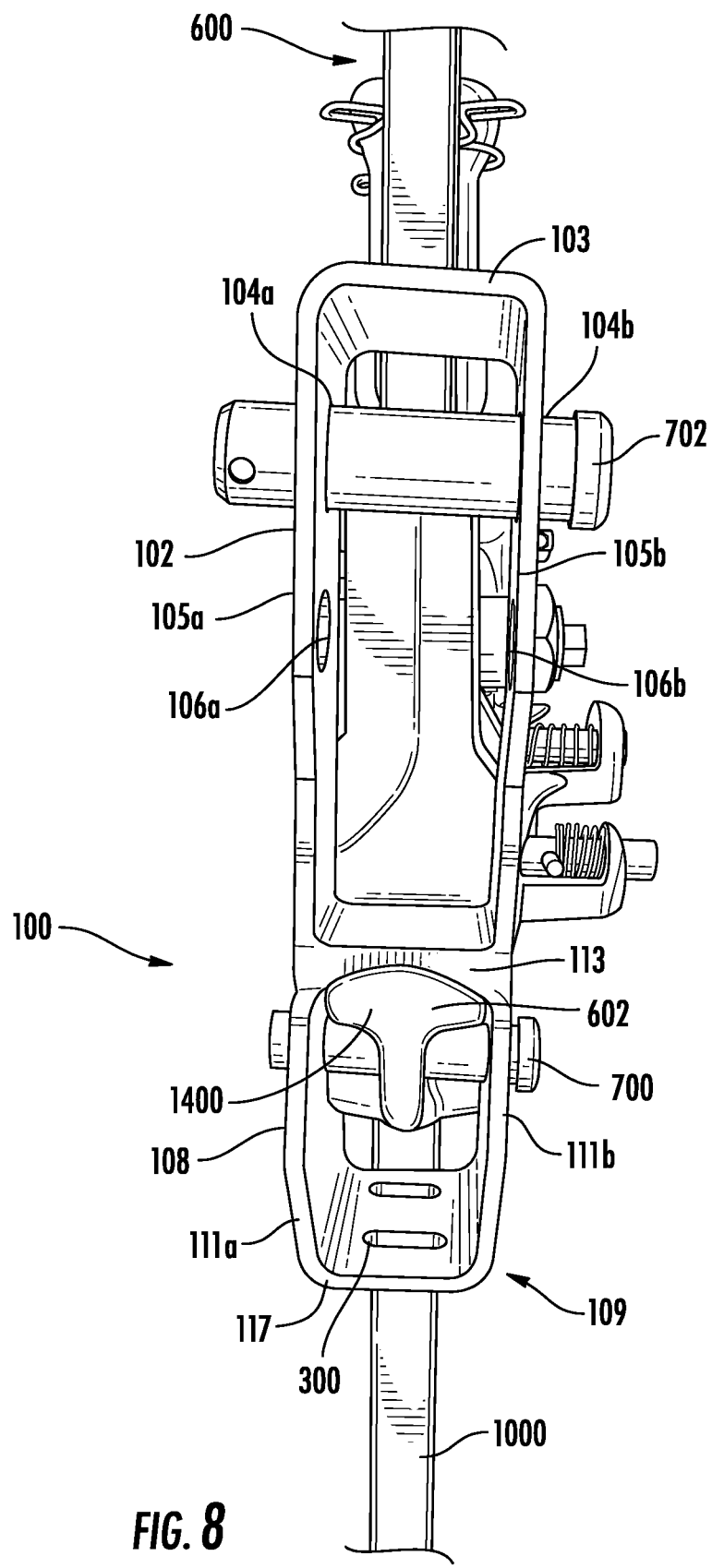
FIG. 8 is a front view of the safety link connected to the jack of FIG. 7 according to various embodiments described herein.
Figure 9:
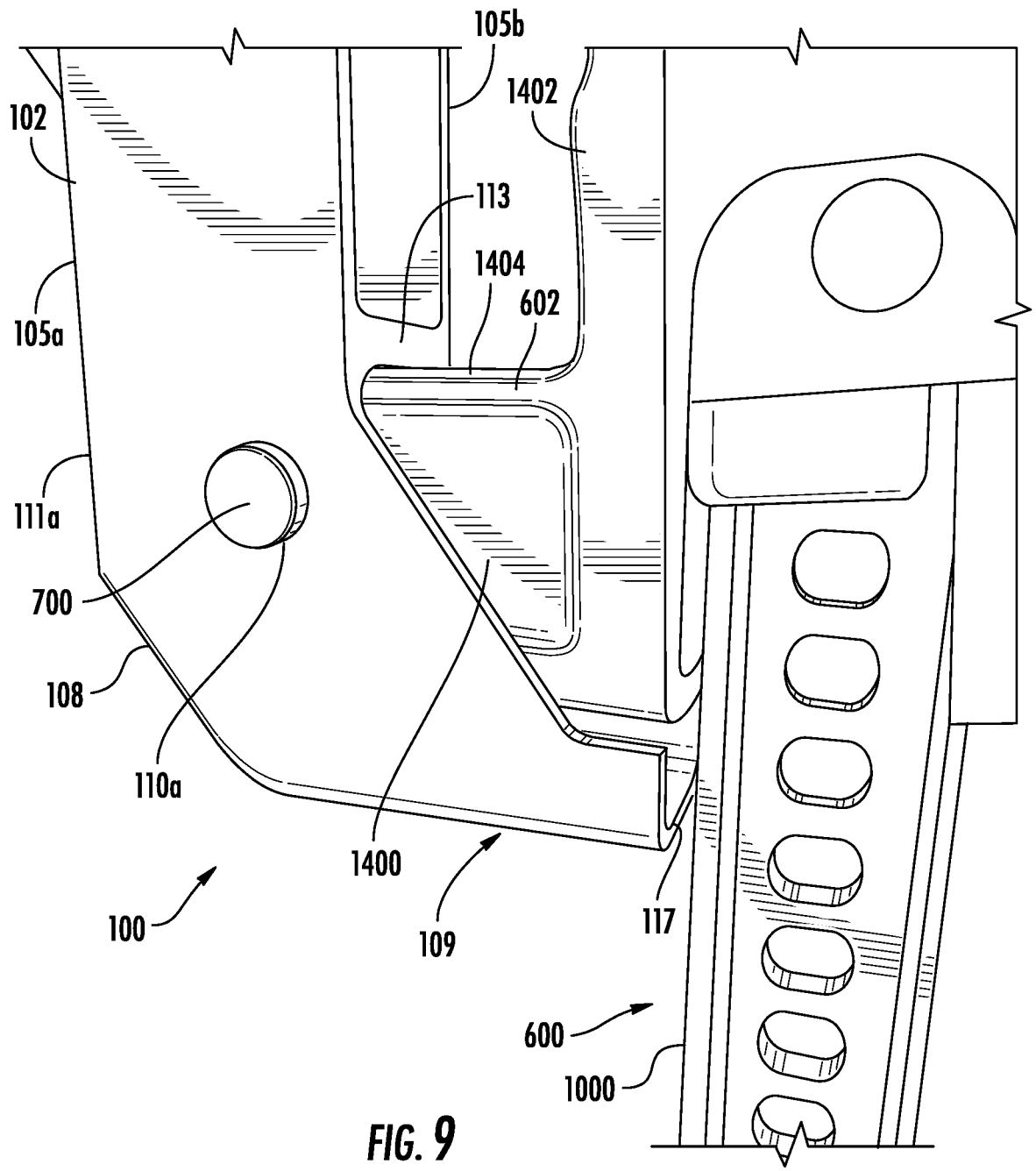
FIG. 9 is a magnified view of the lower bracket connected to the jack of FIG. 7 according to various embodiments described herein.

FIGS. 6-9 illustrate an embodiment of the safety link 100 connected to a jack 600. The exemplified link 100 may be similar to that described with respect to FIGS. 2 & 3. In FIG. 6, the link 100 is shown with a foot 602 of a high-lift jack 600 positioned within the lower bracket 108 with a slot 604 through a runner nose 1400 aligned with the slot 110 through the lower bracket 108. The horizontal plate 113 is also shown supported on a lift pad 1404 of the runner nose 1400. With the slots 110, 604 aligned, a pin 700 may be inserted through the slots 110, 604 to secure the link 100 to the jack 600, e.g., as shown in FIG. 7. FIG. 7 also depicts a pin 702 extending through slot 104 of the upper bracket 102. FIGS. 8 & 9 illustrate additional views of FIG. 7, wherein FIG. 8 is a front view of the link 100 secured to the jack 600, and FIG. 9 is a magnified view of the lower bracket 108 of the link connected to the runner nose 1400 via pin 700.

Figure 12:
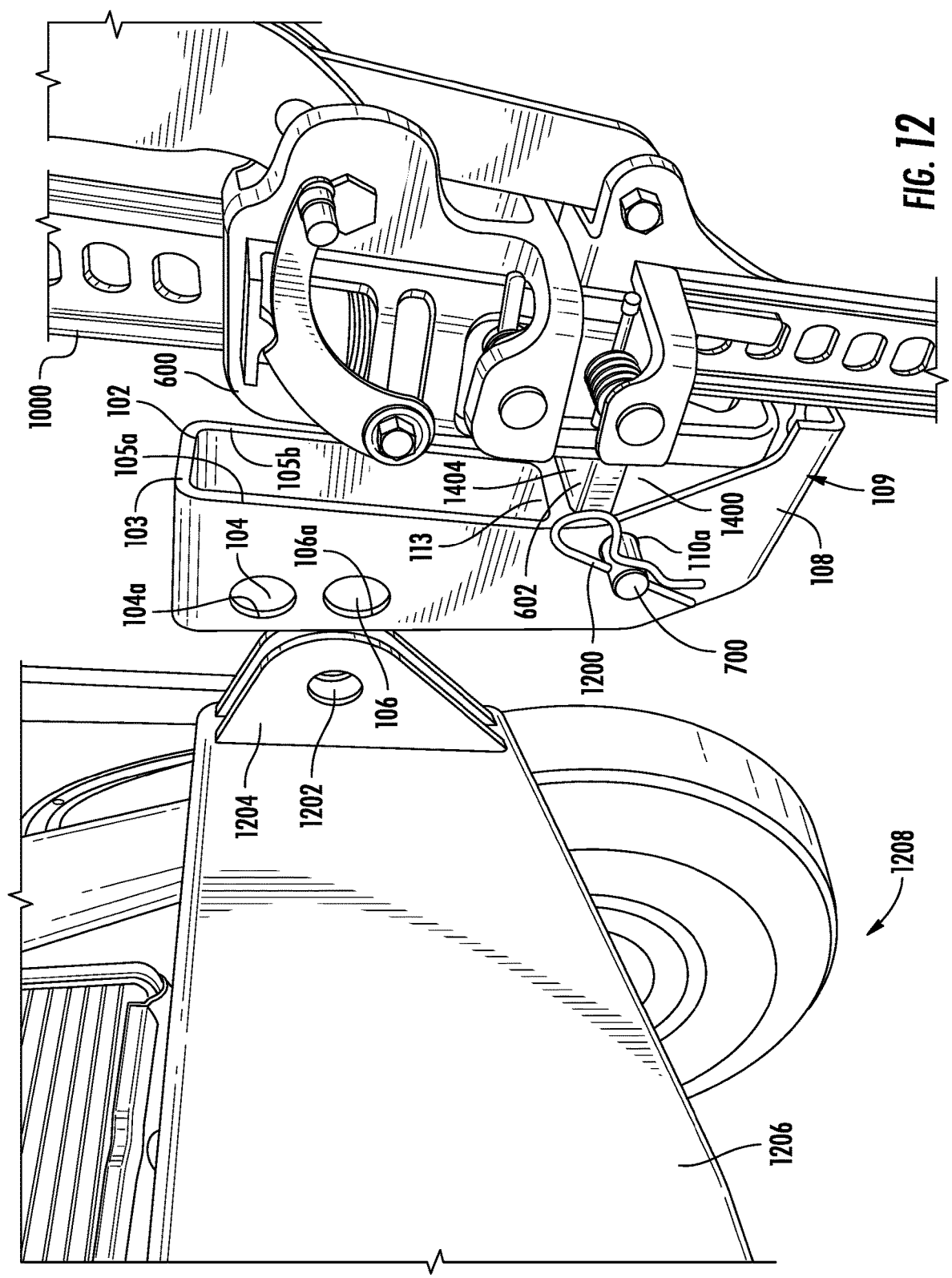
FIG. 12 depicts a safety link connected to a jack along a lower bracket and having an upper bracket positioned adjacent to a shackle tab of a vehicle bumper according to various embodiments described herein.
Figure 13:
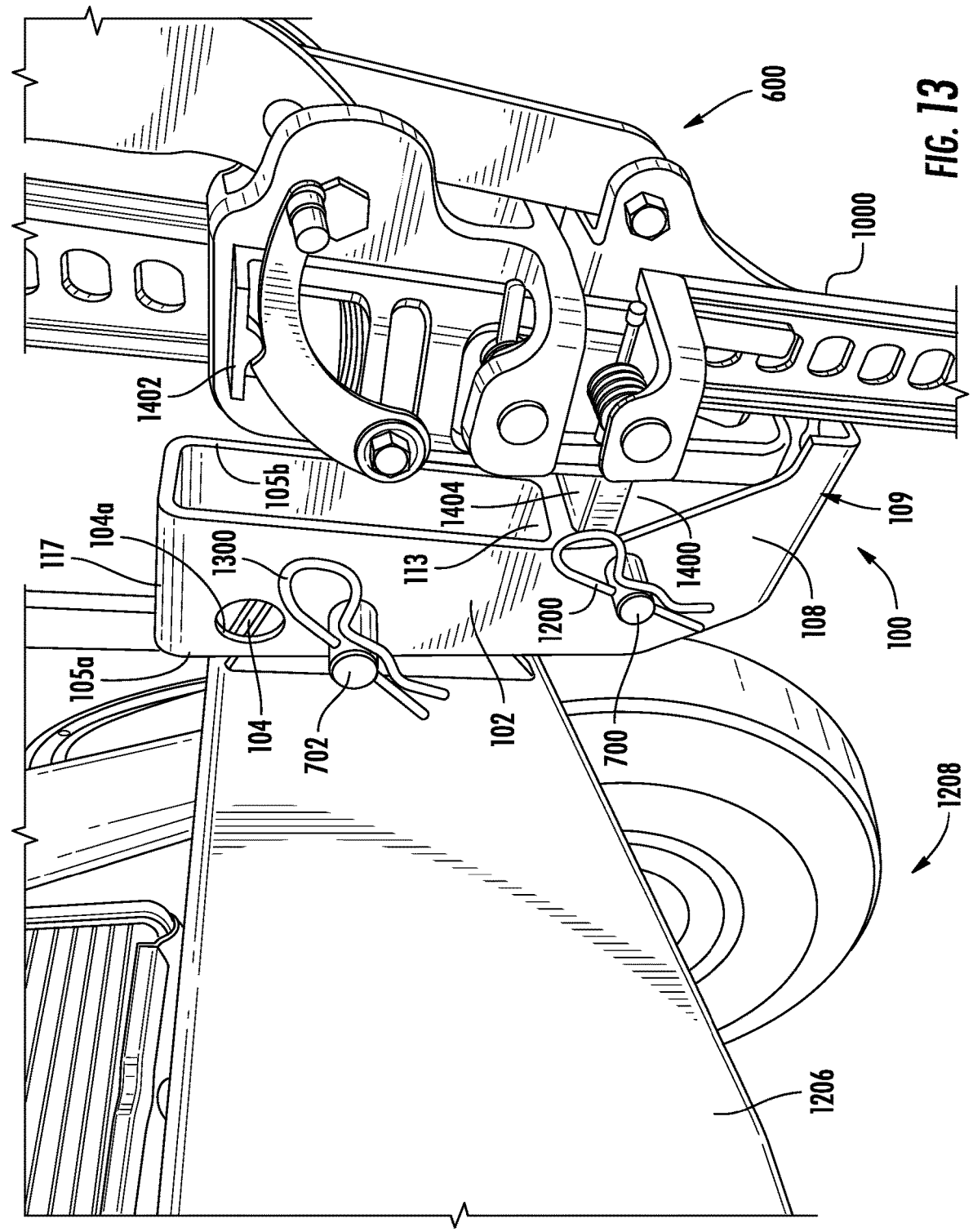
FIG. 13 depicts the safety link connected to the jack of FIG. 12 wherein the safety link is further connected to the shackle tab of the vehicle tab via a pin extending through the upper bracket according to various embodiments described herein.

FIGS. 12 & 13 further illustrate the process of connecting the safety link 100 to an object to be lifted, which is a vehicle 1208 in this instance. In particular, FIG. 12 illustrates pin 700 secured within slots 110, 604 with a cotter pin 1200. The link 100 may be linked to the vehicle 1208 via connection of the upper bracket 102 to the shackle tab 1204. In the illustrated embodiment, slot 104 and slot 106 in the upper bracket 102 are shown adjacent to a slot 1202 through a shackle tab 1204 attached to a bumper 1206 of the vehicle 1208. To attach the upper bracket 102 to the shackle tab 1204, slot 104 or slot 106 may be lined up with slot 1202 of the shackle tab 1204 and a pin 702 may be inserted therethrough.

FIG. 13 illustrates the link 100 connected to the shackle tab 1204 via a pin 702 inserted through slot 106 of the upper bracket 102 and slot 1202 of the shackle tab 1204. A cotter pin 1300 may be used to further secure the pin 702 within the slots 106, 604.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth in this specification. Such embodiments may be obtained, for example, by combining, modifying, or reorganizing any of the disclosed steps, components, elements, features, aspects, characteristics, limitations, and the like, of the various non-limiting and non-exhaustive embodiments described in this specification. For example, in some embodiments, the link may be configured for use with jacks having two or more slots through a lift structure. While embodiments described herein may be used with runners having multiple slots, some embodiments of the link may also include additional slots such that the lower bracket includes multiple slots that correspond to two or more slots through the runner. Some embodiments of links configured to connect to a jack through multiple jack slots may include a lift pad support, such as a horizontal plate or cross-member extending above at least one of the slots or may exclude a lift pad support. In one embodiment, the lower bracket includes a first slot configured to be aligned with a jack slot, e.g., slot through a runner, and a second slot above the first slot configured to receive a pin at a position above a runner nose. A pin may be extended through the second slot to provide a lift pad support or for additional safety if a structural failure occurs with respect to a pin inserted through the first slot and a runner slot. While the link is generally described herein in connection to use with farm jack style high-lift jacks, it is to be appreciated that the link may find use with other style jacks to link an object to be lifted to a jack.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an application of the described embodiments. Further, the use of a singular noun includes the plural, and the use of a plural noun includes the singular, unless the context of the usage requires otherwise. Additionally, the grammatical conjunctions "and" and "or" are used herein according to accepted usage. By way of example, "x and y" refers to "x" and "y". On the other hand, "x or y" generally refers to "x", "y", or both "x" and "y", and may be considered to be generally synonymous with "and/or," whereas "either x or y" refers to exclusivity. It is to be understood that jacks and vehicles come in various shapes and sizes and the link described herein may be modified to conform to such sizes and shapes consistent with the present description. Numerical measurements are provided herein to aid the reader and are not intended to be limiting unless stated as such in the appended claims.

The present disclosure may be embodied in other forms without departing from the spirit or essential attributes thereof and, accordingly, reference should be had to the following claims rather than the foregoing specification as indicating the scope of the invention. Further, the illustrations of arrangements described herein are intended to provide a general understanding of the various embodiments, and they are not intended to serve as a complete description. Many other arrangements will be apparent to those of skill in the art upon reviewing the above description. Other arrangements may be utilized and derived therefrom, such that logical substitutions and changes may be made without departing from the scope of this disclosure.

What is claimed is:

1. A safety link for a high-lift jack, the link comprising:
an upper bracket comprising one or more slots for connecting the link to a vehicle shackle tab via insertion of a first pin into at least one of the one or more upper bracket slots and a slot through the shackle tab; and
a lower bracket comprising one or more slots for connecting the link to a runner of the jack via insertion of a second pin into at least one of the one or more lower bracket slots and a slot through a runner nose of the runner,
wherein the lower bracket comprises a first vertical plate and a second vertical plate, the second vertical plate spaced apart from the first vertical plate, wherein the one or more lower bracket slots include a first slot that is defined by and extends between a first opening through the first vertical plate and a second opening through the second vertical plate, and
wherein the upper bracket comprises a third vertical plate and a fourth vertical plate, the fourth vertical plate spaced apart from the third vertical plate, wherein the one or more upper bracket slots include a third slot that is defined by and extends between a third opening through the third vertical plate and a fourth opening through the fourth vertical plate.

2. The link of 1, further comprising the first pin and the second pin.

3. The link of 1, wherein the one or more slots of the upper bracket comprises a first slot and a second slot, wherein the first slot of the upper bracket is positioned above the second slot of the upper bracket.

4. The link of 1, further comprising a plate that extends above the one or more slots of the lower bracket and below the one or more slots of the upper bracket, wherein the plate is positioned to engage a lift pad extending along the runner nose when the link is connected to the runner.

5. The link of 1, further comprising an extension that extends below and rearward of from the lower bracket to position below the runner nose and adjacent to a vertical bar of the jack when the link is connected to the runner.

6. The link of claim 1, wherein the first and third vertical plates extend along a first plane and the second and fourth vertical plates extend along a second plane.

7. The link of claim 6, further comprising a horizontal plate that extends above the first slot of the lower bracket and below a second slot of the one or more slots of the upper bracket, wherein the horizontal plate is positioned to engage a lift pad of the runner when the link is connected to the runner.

8. The link of claim 7, further comprising an extension that extends below and rearward of the lower bracket to position below the runner nose and adjacent to a vertical bar of the jack when the link is connected to the runner.

9. The link of claim 1, wherein the first and third vertical plates are continuous and extend along a first plane and the second and fourth vertical plates are continuous and extend along a second plane, wherein the link further comprises a horizontal plate that extends from the first and third vertical plates to the second and fourth vertical plates, and wherein the horizontal plate is positioned to engage a lift pad along the runner nose of the jack when the link is connected to the runner.

10. A method of securing a safety link to a high-lift jack and a vehicle shackle tab, the method comprising:
aligning a first slot of a lower bracket of a link with a second slot extending through a runner nose of a runner of the jack;
inserting a first pin through the first slot and second slots connecting the link to the runner;
aligning a third slot in an upper bracket of the link with a fourth slot in a vehicle shackle tab; and
inserting a second pin through the third slot and the fourth slot connecting the link to the vehicle shackle tab,
wherein the lower bracket comprises a first vertical plate and a second vertical plate, the second vertical plate spaced apart from the first vertical plate, wherein the first slot is defined by and extends between a first opening through the first vertical plate and a second opening through the second vertical plate, and
wherein the upper bracket comprises a third vertical plate and a fourth vertical plate, the fourth vertical plate spaced apart from the third vertical plate, wherein the third slot is defined by and extends between a third opening through the third vertical plate and a fourth opening through the fourth vertical plate.

11. The method of claim 10, wherein the link further comprises a plate that extends above the first slot, and wherein aligning the first slot and the second slot comprises positioning the plate on a lift pad that extends along the runner nose.

12. The method of claim 10, wherein the link further comprises an extension that extends below and rearward of from the lower bracket to position below the runner nose and adjacent to a vertical bar of the jack when the link is connected to the runner.

13. The method of claim 10, wherein the first and third vertical plates are continuous and extend along a first plane and the second and fourth vertical plates are continuous and extend along a second plane, wherein the link further comprises a horizontal plate that extends above the first slot and from the first and third vertical plates to the second and fourth vertical plates, and wherein the horizontal plate is positioned to engage a lift pad of the runner when the link is connected to the runner.

14. The method of claim 13, wherein the link further comprises an extension that extends below and rearward of the lower bracket to position below the runner nose and adjacent to a vertical bar of the jack when the link is connected to the runner.

* * * * *